United States Patent [19]

Lapiere et al.

[11] 3,919,248

[45] Nov. 11, 1975

[54] 4-HYDROXY-5-AZACOUMARIN AND DERIVATIVES

[75] Inventors: Charles L. Lapiere, Tongeren; Jean V. Dejardin, Chenee; Barbara R. Mania, Brussels, all of Belgium

[73] Assignee: A. Christiaens Societe Anonyme, Brussels, Belgium

[22] Filed: Sept. 10, 1974

[21] Appl. No.: 504,787

[30] Foreign Application Priority Data

Sept. 10, 1973 United Kingdom............ 42496/73

[52] U.S. Cl. .......... 206/295 F; 260/295 R; 424/263
[51] Int. Cl.² .................................. C07D 405/02
[58] Field of Search.............................. 260/295 F

[56] References Cited
UNITED STATES PATENTS
3,689,493  9/1972  Hunter et al. .................. 260/295 F

*Primary Examiner*—Norman A. Drezin
*Attorney, Agent, or Firm*—Sughrue, Rothwell, Mion, Zinn & Macpeak

[57] ABSTRACT

This invention relates to 3,3'-methylene-bis-(4-hydroxy-5-azacoumarin), its preparation and its use in the pharmaceutical field.

Said compound may be prepared by treating 4-hydroxy-5-azacoumarin by means of formaldehyde or a functional derivative thereof in the presence of a polar solvent.

In view of its amebicidal properties, the compound of this invention may be used as amebicidal agent.

3 Claims, No Drawings

4-HYDROXY-5-AZACOUMARIN AND DERIVATIVES

BACKGROUND OF THE INVENTION

This invention relates to a new derivative of 4-hydroxy-5-azacoumarin, and to the preparation and use of the new derivative.

This invention relates also to new chemical compounds which may be used as intermediates in the preparation of such a new derivative, as well to the preparation of such new intermediates.

The new derivative of 4-hydroxy-5-azacoumarin according to this invention is 3,3-methylene-bis-(4-hydroxy-5-azacoumarin) which may be represented by the following general formula:

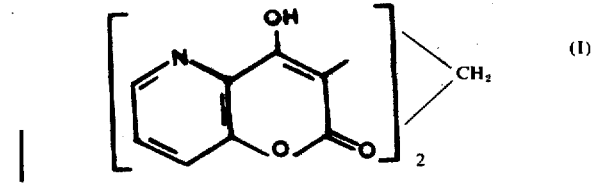

(I)

It has been found that the compound of formula (I) has amebicidal properties, particularly against a human pathogen strain of *Entamoeba histolytica*.

This invention also relates therefore to amebicidal compositions containing, as active ingredient, the above-mentioned derivative of 4-hydroxy-5-azacoumarin of formula (I), namely 3,3-methylene-bis-(4-hydroxy-5-azacoumarin).

This invention relates also to processes for preparing the new compound of formula (I).

According to this invention, a first process for preparing the new compound of formula (I) involves the following steps:

1. Condensation of hydroxypicolinic acid (III) successively with ethyl chloroformate (IV) and ethyl ethoxymagnesium malonate (V) or another metal derivative of ethyl malonate or a metal derivative of ethyl acetylacetate or ethylcyanoacetate, as shown by the following equations:

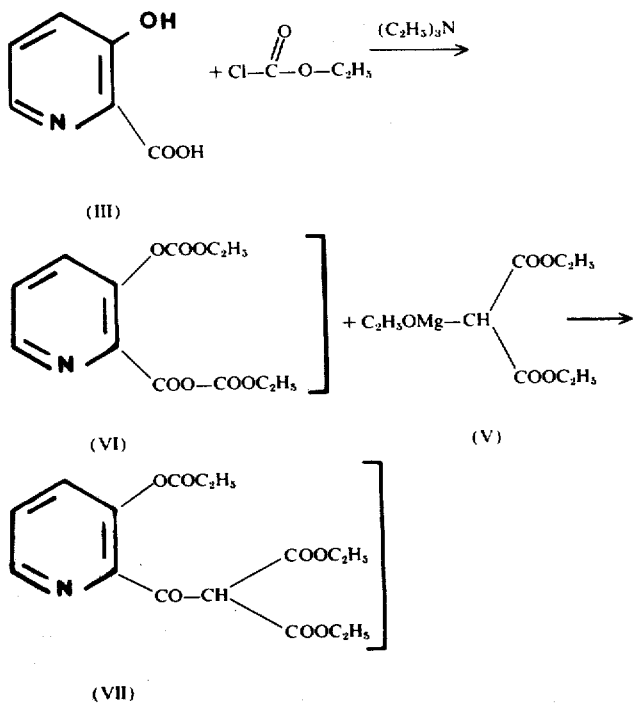

When, in this step 1, ethyl ethoxymagnesium malonate is replaced by a metal derivative of ethyl acetylacetate or ethyl cyanoacetate, an ethyl hydroxypicolinoylacetyl acetate or an ethyl hydroxypicolinoylcyanoacetate is respectively obtained. These latter intermediate compounds are treated in the same manner as intermediate compound (VII) in the following step.

2. Treatment of the obtained intermediate compound (VII) successively with potassium carbonate and with an acid, so as to obtain an hemiester of hydroxypicolinoylmalonic acid (VIII), as shown by the following equation:

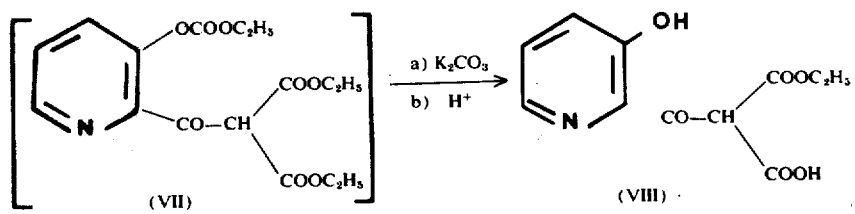

3. Recrystallization of the hemiester of formula (VIII) in dioxan, so as to obtain an anhydro derivative. Cyclization of the hemiester of formula (VIII) or of the anhydroderivative thereof into 4-hydroxy-5-azacoumarin (IX), for example in the presence of polyphosphoric acid, as shown by the following equations:

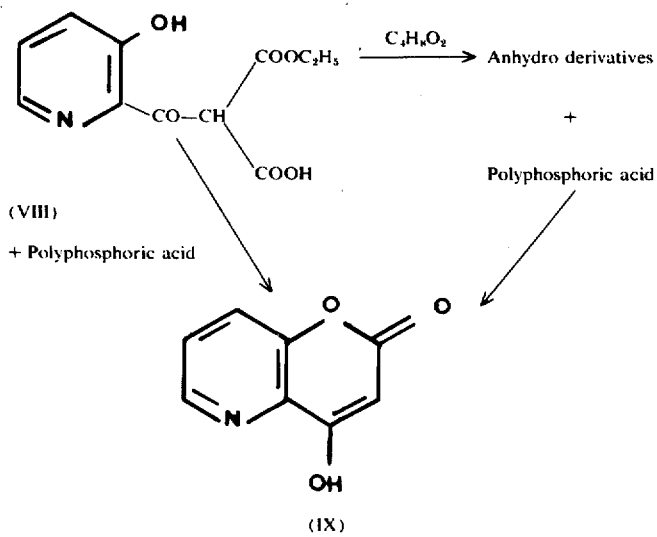

(VIII)

+ Polyphosphoric acid

4. Treatment of the 4-hydroxy-5-azacoumarin (IX) by means of formaldehyde (X) or a functional derivative thereof in the presence of a polar solvent, as shown by the following equation:

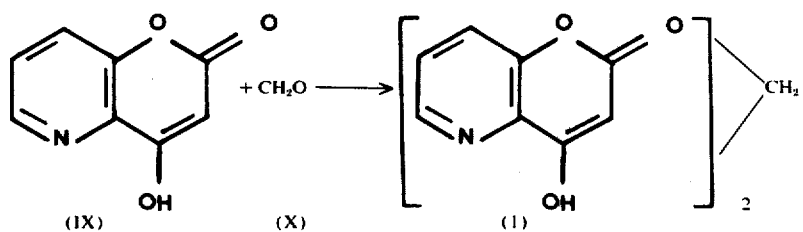

According to this invention, a second process for preparing the new compound of formula (I) involves the following steps:

1. Conversion of the hemiester of hydroxypicolinoyl-malonic acid of formula (VIII) (obtained by steps 1 to 2 of the first process) into 2-acetyl-3-hydroxypyridine (XI) by means of sulfuric acid and acetic acid, as shown by the following equation:

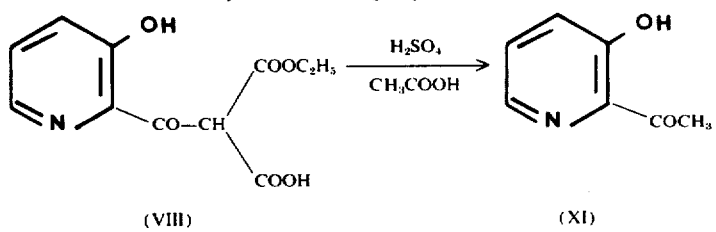

2. Cyclization of the 2-acetyl-3-hydroxypyridine (XI) by means of ethyl carbonate in the presence of sodium, into 4-hydroxy-5-azacoumarin (IX), as shown by the following equation:

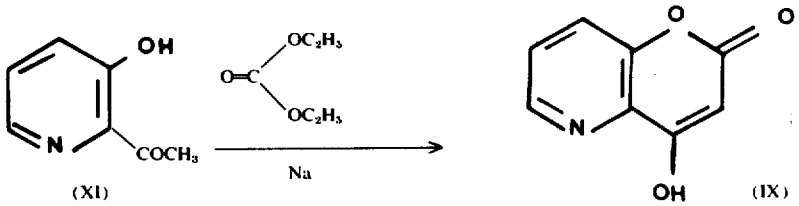

3. Treatment of the 4-hydroxy-5-azacoumarin (IX) by means of formaldehyde (X) or a functional derivative thereof in the presence of a polar solvent, as shown by the following equation:

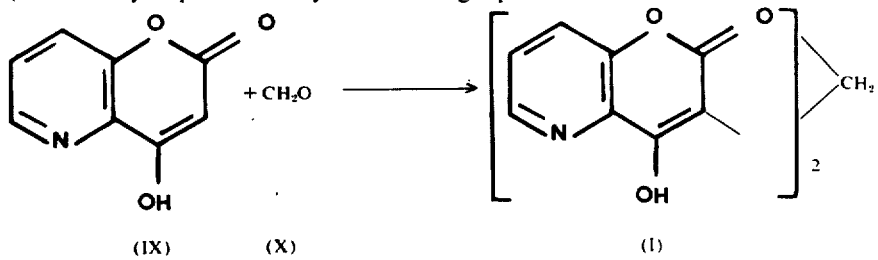

According to this invention, a third process for preparing the new compound of formula (I) involves the following steps:

1. Treatment of the hemiester of hydroxypicolinoylmalonic acid (VIII) (obtained by steps 1 and 2 of the first process) by means of polyphosphoric ester, so as to obtain 3-carbethoxy-4-hydroxy-5-azacoumarin (XII), as shown by the following reaction:

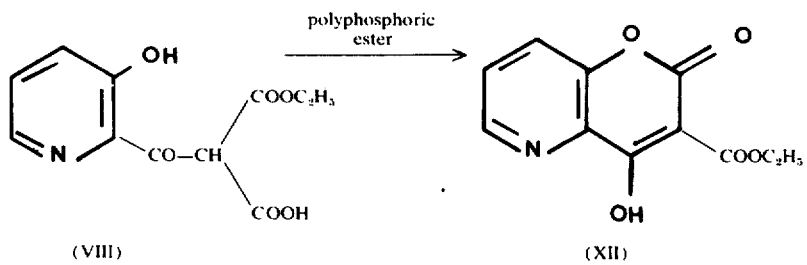

2. Treatment of the 3-carbethoxy-4-hydroxy-5-azacoumarin (XII) with polyphosphoric acid, so as to obtain 4-hydroxy-5-azacoumarin (IX), as shown by the following equation:

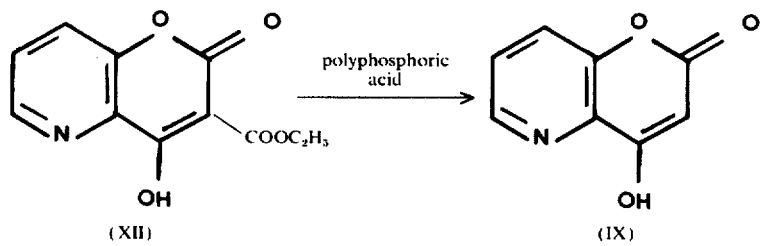

3. Treatment of the 4-hydroxy-5-azacoumarin (IX) by means of formaldehyde (X) or a functional derivative thereof in the presence of a polar solvent, as shown by the following equation:

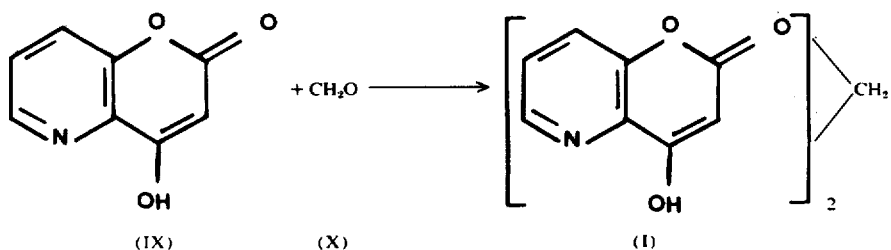

The hemiesters of 3-hydroxypicolinoylmalonic acids of formula (VIII) as well as the anhydro derivatives thereof are new compounds and this invention covers also these hemiesters and anhydro derivatives as such.

The 4-hydroxy-5-azacoumarin of formula (IX), as well as the 4-hydroxy-3-carbethoxy-5-azacoumarin of formula (XII) are also new compounds within the scope of this invention.

This invention is further illustrated by the following examples:

DETAILED DESCRIPTION OF THE INVENTION

EXAMPLE 1

Preparation of the hemiester of 3-hydroxypicolinoylmanolic acid (formula VIII)

A mixture of 36.5 g (0.26 mol) of o-hydroxypicolinic acid, 250 ml of dioxan, 56 g (0.55 mol) of triethylamine and 100 ml of toluene is stirred during 30 minutes in three-necked flask equiped with a mechanical stirrer, a separating funnel and a dryer containing calcium chloride.

200 ml of toluene are added to the obtained solution, which is then cooled at −5°C by means of a mixture of ice and common salt. Within a period of 30 minutes, a solution of 60 g (0.55 mol) of ethyl chloroformate in 150 ml of toluene is then added to the cooled solution. After maintaining the temperature at 0°C during 2 hours, a toluene solution of ethyl ethoxymagnesium malonate is added, the solution having been prepared by using 9.72 g (0.4 mol) of magnesium, 28 ml (0.46 mol) of absolute ethanol and 64 g (0.4 mol) of redistilled ethyl malonate.

The obtained solution is stirred overnight and then acidified by adding carefully a solution of 80 ml of 12N hydrochloric acid in 400 ml of water. The aqueous solution is then stirred for 30 minutes. The organic phase of the solution is then separated by decantation and the aqueous solution is washed two times with benzene. The total organic phases are washed with 0.5N hydrochloric acid and with water. After drying on sodium sulfate, the solvents are evaporated under reduced pressure. An oily residue (106 g) is obtained.

This residue is added, while stirring, to a heated (80°C) solution of 60 g of potassium carbonate in 300 ml of water. If an oily insoluble material is still present after 4 hours, 4 to 6 g of potassium hydroxide dissolved in a small amount of water are added. When the solution is completely cool, the formed orange precipitate is filtered. This precipitate is washed with a small quantity of alcohol and then with acetone. The washed precipitate is dissolved in 300 ml of water under gentle heating. The obtained aqueous solution is acidified to a pH of 1–2 by means of hydrochloric acid. An oragne precipitate of flakes of the hemiester of 3-hydroxypicolinoylmalonic acid is obtained. After washing with water and drying, 20.5 g of the desired hemiester are obtained. Melting point: 172°–173°C.

Analysis: Found %: C 52.26; H 4.74: N 5.65; mol. weight: 252. Calculated for $C_{11}H_{11}NO_6$ %: C 52.22; H 4.39; N 5.57; mol. weight: 253.195.

EXAMPLE 2

Preparation of the anhydro derivative of the hemiester of 3-hydroxypicolinoylmalonic acid (formula VIII)

When the product obtained in example 1 is recrystallized from dioxan, an orange product is obtained. The analysis shows that this product is a dehydration product of the hemiester of Example 1. The dehydrated product melts at 181°–182° C.

Analysis: Found %: C 56.38; H 4.04; N 6.22. Calculated for $C_{11}H_9NO_5$ %: C 56.17; H 3.86; N 5.95.

Infrared spectrum: absorption at 1775, 1635, 1485, 1468, 797 and 769 cm$^{-1}$

N.M.R. spectrum in dimethylsulfoxide at 60°C : $\delta CH_3$ = 1 ppm; $\delta CH_2$ = 4.1 ppm; $\delta H_7$ and $\delta H_8$ = 8.1 ppm; $\delta H_6$ = 8.6 ppm.

EXAMPLE 3

Preparation of 2-acetyl-3-hydroxypyridine (formula XI)

50 g of the ethyl hemiester of 3-hydroxypicolinoylmalonic acid are refluxed on an oil bath during 24 hours with a mixture of 150 ml of acetic acid, 100 ml of water and 20 ml of concentrated sulfuric acid. The cooled mixture is then poured into 600 ml of water and brought to a pH of 5 by addition of sodium bicarbonate, with stirring. The obtained solution is extracted by means of chloroform, and the chloroform solution dired on sodium sulfate is concentrated under reduced pressure. The residue is distilled under a vacuum of about 1 mm of Hg. 16 g of the desired product are obtained. After recrystallization from a mixture of methanol and water or from a mixture of acetic acid and water, the product melts at 58° C.

Analysis: Found %: C 61.22; H 4.97; N 10.81. Calculated for $C_7H_7NO_2$ %: C 61.31; H 5.15; N 10.71.

EXAMPLE 4

Preparation of 3-carbethoxy-4-hydroxy-5-azacoumarin (formula XII)

4 g of the ethyl hemiester of 3-hydroxypicolinoylmalonic acid and 50 g of polyphosphoric ester are gently refluxed at 80° C during 1 hour. The cooled solution is extracted with water and brought with stirring to a pH of about 3 by careful addition of sodium bicarbonate. The stirring is continued for 1 hour, a further amount of sodium bicarbonate being added, if necessary, for maintaining the pH at about 3. The aqueous solution is then extracted two times by 100 ml of chloroform. The chloroform solutions are dried and concentrated under vacuum. The residue is recrystallized from absolute ethanol. 1.1 g of a white product melting at 133° C are obtained.

Analysis: Found %: C 56.28; H 3.73; N 6.09; mol. weight: 234.8. Calculated for $C_{11}H_9NO_5$ %: C 56.17; H 3.86; N 5.95; mol. weight: 235.195.

EXAMPLE 5

Preparation of 4-hydroxy-5-azacoumarin (formula IX)

To 2.7 g (0.02 mol) of 3-hydroxy-2-acetyl-pyridine, 24 g (0.2 mol) of ethyl carbonate and 2 g (0.085 mol) of sodium are added. The mixture is then gently heated until the reaction starts and left for one night.

The sodium excess is decomposed by addition of methanol, and the solution is then poured into an excess of phosphoric acid solution. The pH is adjusted to a value of 2, and the 4-hydroxy-5-azacoumarin is extracted by means of chloroform. The chloroform solution is dried and concentrated under reduced pressure. The residue is recrystallized from benzene. After a new recrystallization from water or benzene, the product melts at 242° C.

Analysis: Found %: C 58.72; H 3.40; N 8.61; mol. weight: 164.2. Calculated for $C_8H_5NO_3$ %: C 58.90; H 3.09; N 8.56; mol. weight: 163.132.

EXAMPLE 6

Preparation of 4-hydroxy-5-azacoumarin (formula IX)

34g (0.135 mol) of the ethyl hemiester of 3-hydroxypicolinoylmalonic acid and 210 g of polyphosphoric acid are heated on an oil bath at 127° C until no more gas evolves. After cooling to a temperature of about 30–40° C, the mixture is extracted with 1 litre of water and stirred for dissolving the polyphosphoric acid. 150 g of sodium bicarbonate are slowly added, while stirring, so as to bring the pH of the solution to about 3. The solutions is then cooled with water during 30 minutes. The 4-hydroxy-5-azacoumarin precipitates. After filtration and recrystallization from water or benzene, the product melts at 242.5° C (decomposition).

The product may also be recrystallized from a mixture of dioxan and petroleum ether (B.P. 100°–140° C) or from absolute alcohol.

Analysis: Found %: C 58.81; H 3.3; N 8.70; mol weight: 161.9. Calculated for $C_8H_5NO_3$ %: C 58.90; H 3.09; N 8.56; mol.weight: 163.132.

EXAMPLE 7

Preparation of 3,3'-methylene-bis-(4-hydroxy-5-azacoumarin) (formula I)

7 g (0.043 mol) of 4-hydroxy-5-azacoumarin are dissolved in 800 ml of boiling water. 9 ml of a 36 % solution of formaldehyde are added and the mixture is left overnight. The precipitate is collected, washed with water and dried at 60° C. 6.4 g of the desired product which decomposes at more than 300° C are obtained.

This product is practically insoluble in water, alcohol, ether, chloroform and benzene. It is soluble in the strong acids and the bases.

Analysis: Found %: C 60.10; H 3.14; N 8.41; equivalent: 166.9. Calculated for $C_{17}H_{10}N_2O_6$ %: C 60.36; H 2.98; N 8.28; equivalent: 169.14.

Infrared spectrum: absorptions at 3200 $cm^{-1}$ (OH), 1720 $cm^{-1}$ (C=O), 1642 $cm^{-1}$ and 1582 $cm^{-1}$ (C=C, C=N)

N.M.R. spectrum in $CF_3COOH$ : $\delta H_6 = 8.67$ ppm; $\delta H_7 = 8.05$ ppm; $\delta H_8 = 8.37$ ppm; $\delta CH_2 = 3.81$ ppm.

In vitro and in vivo tests showing the amebicidal activity of 3,3-methylene-bis-(4-hydroxy-5-azacoumarin), will now be described.

In vitro tests

These tests have been performed on the liquid monophase Jones medium inoculated with a human pathogen strain of *Entamoeba histolytica*.

In a first series of tubes, increasing amounts from 6.25 to 100 μg/ml of the compound of formula I (code name JVD 203) have been added.

In a second series of tubes, corresponding amounts of a known amebicidal reference compound, i.e., phanquinone (4,7-phenanthroline-5,6-quinone), have been added.

A first check tube contained only the culture medium, whereas a second check tube contained the same culture medium to which solvents used for solubilizing the active products had been added.

The results of the in vitro tests which have been duplicated are summarized in the following table where the signs — and + indicate respectively the absence and the presence of amoebae.

TABLE I.

| Check tubes containing only the culture medium | | | | | |
|---|---|---|---|---|---|
| tube 1 | + | | | | |
| tube 2 | + | | | | |
| Check tubes containing the culture medium + solvents | | | | | |
| tube 1 | + | | | | |
| tube 2 | + | | | | |
| Tubes containing JVD 203 according to this invention | | | | | |
| Concentrations in μg/ml | | | | | |
| | 100 | 50 | 25 | 12.5 | 6.25 |
| tube 1 | − | − | − | − | + |
| tube 2 | − | − | − | − | + |
| Tubes containing the reference product (phanquinone) | | | | | |
| Concentrations in μg/ml | | | | | |
| | 100 | 50 | 25 | 12.5 | 6.25 |
| tube 1 | − | − | − | + | + |
| tube 2 | − | − | − | + | + |

These tests clearly show that the product according to this invention (JVD 203) is about two times more active than the reference product.

In vivo tests

Three weeks old rats of an average weight of 30 g have been infested by intracaecal inoculation of 0.3 ml of a virulent culture of *Entamoeba histolytica*. The animals have been divided into 3 groups comprising each 5 animals which have been subjected during seven days to one of the three following treatments:

JVD 203 compound according to this invention: 100 mg/kg/day by oral route,
Reference compound (phanquinone): 100 mg/kg/day by oral route,
Physiological solution: 1 ml/10 g/day by oral route.

The animals have been killed on the 8th day and the presence of amoebae in the caecum has been checked both by microscopic examination and by culture on the Jones medium. The possible presence of mucus, ulcerations or caecal oedema is also noted.

The results of these in vivo tests are given in the following table II.

TABLE II.

| | Rat N° | Ulcerations | Oedema | Mucus | Number of amoebae per microscopic field |
|---|---|---|---|---|---|
| Check test (physiological solution) | 1 | ++ | ++ | 0 | 10 |
| | 2 | ++ | ++ | 0 | 5 |
| | 3 | 0 | ++ | 0 | 6 |
| | 4 | 0 | ++ | + | 4 |
| | 5 | 0 | ++ | 0 | 8 |
| J.V.D. 203 | 1 | 0 | 0 | 0 | 0 |
| | 2 | 0 | 0 | 0 | 0 |
| | 3 | 0 | 0 | 0 | 0 |
| | 4 | 0 | 0 | 0 | 0 |
| | 5 | 0 | 0 | 0 | 0 |
| Phanquinone | 1 | 0 | +++ | 0 | 0 |
| | 2 | 0 | +++ | 0 | 0 |
| | 3 | 0 | +++ | 0 | 0 |
| | 4 | 0 | +++ | 0 | 0 |
| | 5 | death | +++ | 0 | 0 |

These tests clearly show that the compound according to this invention is at least equivalent and probably more active than phanquinone as an amebicidal agent.

The following examples illustrate the pharmaceutical compositions according to this invention.

EXAMPLE 8
TABLET

| | |
|---|---|
| 3,3'-Methylene-bis-(4-hydroxy-5-azacoumarin) | 10 mg |
| Lactose | 200 mg |
| Potato starch | 102 mg |
| Talc | 35 mg |
| Magnesium stearate | 3 mg |
| | for one tablet | dose : 3 to 6 tablets per day.

EXAMPLE 9
CAPSULE.

| | |
|---|---|
| 3,3'-Methylene-bis-(4-hydroxy-5-azacoumarin) | 100 mg |
| Lactose | 118 mg |
| Corn starch | 60 mg |
| Colloidal Silica | 2 mg |
| | for one capsule | dose : 2 to 3 capsule per day.

EXAMPLE 10

PILLS

| Core | |
|---|---|
| 3,3'-Methylene-bis-(4-hydroxy-5-azacoumarin) | 50 mg |
| Lactose | 171 mg |
| Potato starch | 13 mg |
| Polyvidone | 13 mg |
| Talc | 3 mg |
| Coating. | |
| Gum arabic | 8.5 mg |
| Talc | 48.5 mg |
| Cellulose acetophthalate | 18.5 mg |
| Ethyl phthalate | 3.9 mg |

PILLS-continued

| Core | |
|---|---|
| Magnesium stearate | 2.5 mg |
| Titanium oxide | 0.8 mg |
| Lacquer of orange yellow S | 0.2 mg |
| Sucrose | 166.8 mg |
| White Wax-Carnauba wax | 0.3 mg | for one pill dose : 1 or 2 pills, three times a day.

What we claim is:
1. 3,3'-methylene-bis-(4-hydroxy-5-azacoumarin).
2. 4-hydroxy-5-azacoumarin.
3. 4-hydroxy-3-carbethoxy-5-azacoumarin.

* * * * *